United States Patent
Mashimo et al.

(10) Patent No.: US 12,288,873 B2
(45) Date of Patent: Apr. 29, 2025

(54) SECONDARY BATTERY ELECTRODE AND METHOD FOR PRODUCING THE ELECTRODE

(71) Applicant: PRIME PLANET ENERGY & SOLUTIONS, INC., Tokyo (JP)

(72) Inventors: Naohiro Mashimo, Toyota (JP); Katsushi Enokihara, Toyota (JP); Haruka Shionoya, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 612 days.

(21) Appl. No.: 17/672,897

(22) Filed: Feb. 16, 2022

(65) Prior Publication Data
US 2022/0278315 A1 Sep. 1, 2022

(30) Foreign Application Priority Data
Mar. 1, 2021 (JP) .................. 2021-031944

(51) Int. Cl.
*H01M 4/36* (2006.01)
*H01M 4/04* (2006.01)
(Continued)

(52) U.S. Cl.
CPC ......... *H01M 4/366* (2013.01); *H01M 4/0404* (2013.01); *H01M 4/043* (2013.01);
(Continued)

(58) Field of Classification Search
CPC ..................................... H01M 4/366
See application file for complete search history.

(56) References Cited

U.S. PATENT DOCUMENTS

| 2006/0251965 A1 | 11/2006 | Nagayama et al. |
| 2014/0342225 A1 | 11/2014 | Isshiki et al. |
| (Continued) | | |

FOREIGN PATENT DOCUMENTS

| CN | 104766993 A | 7/2015 |
| EP | 3 657 576 A1 | 5/2020 |
| (Continued) | | |

*Primary Examiner* — Nathanael T Zemui
(74) *Attorney, Agent, or Firm* — Finnegan, Henderson, Farabow, Garrett and Dunner LLP

(57) ABSTRACT

The electrodes disclosed herein, a low-density region having a relatively low electrode density and a high-density region having a relatively high electrode density are repeated on a surface of the electrode active material layer in a predetermined pattern at a constant pitch. The electrode active material layer is evenly divided into three layers of an upper layer, an intermediate layer, and a lower layer in a thickness direction from the surface of the active material layer to the electrode current collector, and when the electrode densities (g/cm³) of the upper layer, the intermediate layer, and the lower layer of the low-density region are respectively $d_{L1}$, $d_{L2}$, and $d_{L3}$ and the electrode densities (g/cm³) of the upper layer, the intermediate layer, and the lower layer of the high-density region are respectively $d_{H1}$, $d_{H2}$, and $d_{H3}$, a relation of $d_{H3}/d_{L3} < d_{H1}/d_{L1}$ is satisfied.

4 Claims, 9 Drawing Sheets

(51) Int. Cl.
*H01M 4/139* (2010.01)
*H01M 10/0525* (2010.01)
*H01M 4/02* (2006.01)

(52) U.S. Cl.
CPC ....... *H01M 4/139* (2013.01); *H01M 10/0525* (2013.01); *H01M 2004/021* (2013.01); *H01M 2004/025* (2013.01)

(56) References Cited

U.S. PATENT DOCUMENTS

| | | |
|---|---|---|
| 2015/0194664 A1 | 7/2015 | Saka et al. |
| 2016/0118642 A1 | 4/2016 | Enokihara |
| 2017/0157642 A1 | 6/2017 | Ozaki et al. |
| 2017/0346067 A1 | 11/2017 | Umehara et al. |
| 2018/0241043 A1 | 8/2018 | Miyatake et al. |
| 2020/0161642 A1 | 5/2020 | Park et al. |
| 2023/0102903 A1* | 3/2023 | Heo .................. H01M 4/0471 429/209 |

FOREIGN PATENT DOCUMENTS

| | | |
|---|---|---|
| JP | 2002-015764 A | 1/2002 |
| JP | 2005-050755 A | 2/2005 |
| JP | 2007-328977 A | 12/2007 |
| JP | 2013-077560 A | 4/2013 |
| JP | 2015-138619 A | 7/2015 |
| JP | 2016-081871 A | 5/2016 |
| JP | 2017-100103 A | 6/2017 |
| JP | 2017-212088 A | 11/2017 |
| JP | 2018-137187 A | 8/2018 |
| JP | 2019-046765 A | 3/2019 |
| JP | 2019-212464 A | 12/2019 |
| JP | 2020-061282 A | 4/2020 |
| JP | 2013-008523 A | 1/2023 |
| KR | 10-2020-0059057 A | 5/2020 |

* cited by examiner

AFTER DRYING STEP

PRESSING STEP

AFTER PRESSING STEP

AFTER DRYING STEP

PRESSING STEP

AFTER PRESSING STEP

SECONDARY BATTERY ELECTRODE AND METHOD FOR PRODUCING THE ELECTRODE

CROSS REFERENCE TO RELATED APPLICATIONS

Priority is claimed based on Japanese Patent Application No. 2021-031944, filed on Mar. 1, 2021, the content of which is incorporated in the present specification as a whole by reference.

BACKGROUND OF THE DISCLOSURE

1. Technical Field

The present disclosure relates to a secondary battery electrode and a method for producing the electrode.

2. Description of Background

Secondary batteries such as lithium ion secondary batteries are lighter in weight and have a higher energy density than existing batteries, and are therefore preferably used as high-output power sources for mounting on vehicles or power sources for personal computers and portable terminals. In particular, lithium ion secondary batteries are preferably used as high-output power sources for driving vehicles such as battery electric vehicles (BEV), hybrid electric vehicles (HEV), and plug-in hybrid electric vehicles (PHEV).

Examples of typical structures of positive electrodes and negative electrodes (hereinafter, simply referred to as "electrodes" in a case where positive and negative electrodes are not particularly distinguished) in these kinds of secondary batteries include one in which an electrode active material layer having as a main component an electrode active material on a single surface or both surfaces of a foil-shaped electrode current collector is formed. Such an electrode active material layer is formed such that a slurry (paste)-like electrode material prepared by dispersing solid contents, such as an electrode active material, a binding material (binder), and a conductive material, in a predetermined solvent is applied on the surface of a current collector to form a coating film, the coating film is dried, and then a pressing pressure is applied thereto to obtain predetermined density and thickness.

There is a demand for further improvement in the battery performance of secondary batteries such as increase in capacity and increase in energy density. In order to increase the capacity and the energy density of secondary batteries, an electrode active material layer may be more thickly applied compared to the conventional art and pressed at a predetermined pressing pressure, for example. However, in general, it is difficult for Li ions to diffuse uniformly to an electrode active material near a current collector, and particularly in a case where an electrode active material layer is made thicker and denser than before, Li ions become depleted in an electrode active material near a current collector, whereby there is hardly any improvement in battery performance (for example, battery capacity).

It is disclosed in Japanese Patent Application Publication No. 2005-50755 that an electrode having a concentration gradient such that the concentration of solid contents increases from the surface of an electrode active material layer to a current collector is used in order to provide a non-aqueous electrolyte battery that exhibits excellent battery performance during high current rate discharge. In addition, in Japanese Patent Application Publication No. 2015-138619, a method for producing an electrode having a concave-convex pattern by applying a negative electrode active material mixture paste to at least one current collector, drying the paste, and then supplying a solvent thereto again and pressing a mold having a concave-convex pattern thereon is disclosed for the purposes of high output, high energy density, and the like.

SUMMARY

However, in the technique disclosed in Japanese Patent Application Publication No. 2015-138619, since a solvent is supplied again to an electrode of which electrode density has been improved through pressing after drying, the solvent is not allowed to permeate uniformly into an electrode active material layer. By pressing a mold having a concave-convex pattern onto the electrode active material layer in such a state, the density of a surface portion of the electrode is locally increased (that is, densified). Accordingly, since the surface portion of the electrode is densified more than necessary, insertion and desorption routes for Li ions narrow and the ion diffusivity decreases. In addition, in the techniques of Japanese Patent Application Publication No. 2005-50755 and Japanese Patent Application Publication No. 2015-138619, it is necessary to increase the number of coating steps or drying steps in addition to a usual method for producing an electrode. Therefore, production costs increase compared with the usual method for producing an electrode.

With the foregoing in view, it is a main object of the present disclosure to provide an electrode having improved ion diffusivity by having a relatively high-density region and a relatively low-density region on a surface portion of the electrode. A further object of the present disclosure is to provide a method for producing such an electrode through a method in which production costs are reduced.

In order to achieve the above-described objects, a secondary battery electrode is provided. The secondary battery electrode disclosed herein which is either a positive or negative electrode of a secondary battery includes an electrode current collector and an electrode active material layer formed on the electrode current collector, and a low-density region having a relatively low electrode density and a high-density region having a relatively high electrode density are repeated on a surface of the electrode active material layer in a predetermined pattern at a constant pitch. With the electrode active material layer being evenly divided into three layers of an upper layer, an intermediate layer, and a lower layer in a thickness direction from the surface of electrode the active material layer to the electrode current collector, and where the electrode densities ($g/cm^3$) of the upper layer, the intermediate layer, and the lower layer of the low-density region are respectively $d_{L1}$, $d_{L2}$, and $d_{L3}$, and the electrode densities ($g/cm^3$) of the upper layer, the intermediate layer, and the lower layer of the high-density region are respectively $d_{H1}$, $d_{H2}$, and $d_{H3}$, a relation of $(d_{H3}/d_{L3})<(d_{H1}/d_{L1})$ is satisfied.

The low-density region of the electrode active material layer which has appropriate gaps (voids) between solid contents is in a state in which insertion and desorption routes for Li ions are formed. In addition, the high-density region of the electrode active material layer with relatively good contact characteristics within solid contents is in a state in which a conductive path is suitably formed. The entire electrode active material layer can be made to efficiently contribute to an electrochemical reaction due to the low-density region and the high-density region that form a predetermined pattern instead of a surface portion of the electrode being completely densified. Accordingly, it is possible to realize an electrode having improved ion diffusivity in the electrode active material layer.

In one suitable aspect of the electrode disclosed herein, the upper layer $d_{L1}$ and the lower layer $d_{L3}$ of the low-density region in the electrode active material layer have a relation of $(d_{L1}/d_{L3})<1.1$.

The low-density region is a region functioning as an insertion and desorption route for Li ions as described above, and when such a low-density region is formed in a state in which the density difference between an upper layer and a lower layer is small, Li ions can be suitably introduced into the electrode active material present near the current collector. Accordingly, it is possible to provide an electrode having more improved ion diffusivity.

In one suitable aspect of the electrode disclosed herein, the low-density region and the high-density region are repeated at a pitch of 250 μm or more and 5 mm or less.

According to such a configuration, it is possible to effectively improve the ion diffusivity.

In one preferred aspect of the electrode disclosed herein, the surface of the electrode active material layer has a concave/convex shape with a predetermined pattern, the low-density region is formed in a concave portion of the concave/convex shape, and the high-density region is formed in a convex portion of the concave/convex shape.

According to such a configuration, Li ions more easily diffuse to the electrode active material near the current collector, thereby improving the diffusivity of the Li ions.

In order to achieve the above-described further object, a method for producing an electrode is provided. The method for producing an electrode disclosed herein is a method for producing an electrode which is either a positive or negative electrode and includes an electrode current collector and an electrode active material layer, the method including the following steps: a step in which a moisture powder formed by aggregated particles containing at least an electrode active material, a binder resin, and a solvent is prepared, here, in the moisture powder, at least 50% by number or more of the aggregated particles form a pendular state or a funicular state in a solid phase, a liquid phase, and a gas phase; a step in which a coating film composed of the moisture powder is formed using the moisture powder on the electrode current collector while leaving a gas phase of the coating film; a step in which a concave/convex shape is formed at a predetermined pattern and a constant pitch on a surface part of the coating film having the gas phase; a step in which the coating film which the concave/convex shape is dried, to form an electrode active material layer; and a step which the electrode active material layer is pressed.

According to such a configuration, it is possible to produce a suitable electrode having the above-described characteristics. In addition, it is possible to the manufacturing of such an electrode may be realized by carrying out the step of forming concave/convex shape before the drying. For this reason, it is possible to reduce the production costs compared with in a conventional production method in which a coating step or a drying step is performed plural times.

In one preferred aspect of the method for producing an electrode disclosed herein, in the concave/convex shape forming step, the coating film has an average value of 55% or less of an area occupied by a gas phase in a unit cross-sectional area in a cross-sectional SEM image of the coating film.

According to such a configuration, when a gas phase is included, the spreadability of the coating film can be improved and the step of forming concave/convex shape can be more suitably carried out.

In one suitable aspect of the method for producing an electrode disclosed herein, in the moisture powder prepared in the step of preparing the moisture powder, if the bulk specific gravity measured by placing an amount (g) of the moisture powder in a container having a prescribed volume (mL) and then leveling the moisture powder without applying a force is referred to as the loose bulk specific gravity X (g/mL), and the specific gravity calculated from the composition of the moisture powder on the assumption that no gas phase is present is referred to as the true specific gravity Y (g/mL), then the ratio of the loose bulk specific gravity X and the true specific gravity Y (Y/X) is 1.2 or more.

According to such a configuration, it is possible to more suitably produce a high-quality electrode.

In one preferred aspect of the method for producing an electrode disclosed herein, the concave/convex forming step is performed by pressing a rotary roll having a predetermined pattern formed on a surface of the coating film of electrode the current collector having the coating film.

According to such a configuration, it is possible to form desired concave/convex on the surface of the coating film without applying an excessive load thereto.

BRIEF DESCRIPTION OF THE DRAWINGS

FIGS. 5A to 5D are explanatory views schematically showing a state where there are solid phases (solid contents such as active materials), liquid phases (solvents), and gas phases (voids) in aggregated particles constituting a moisture powder, in which FIG. 5A shows a pendular state, FIG. 5B shows a funicular state, FIG. 5C shows a capillary state, and FIG. 5D shows a slurry state:

FIGS. 8A to 8C are views schematically showing a pressing step of an electrode mixture layer according to one embodiment, in which FIG. 8A shows a state after a drying step. FIG. 8B shows a state of the pressing step, and FIG. 8C shows a state after the pressing step;

FIGS. 9A to 9C are views schematically showing a pressing step of an electrode mixture layer according to another embodiment, in which FIG. 9A shows a state after a drying step, FIG. 9B shows a state of the pressing step, and FIG. 9C shows a state after the pressing step;

DETAILED DESCRIPTION

Figure 1A:
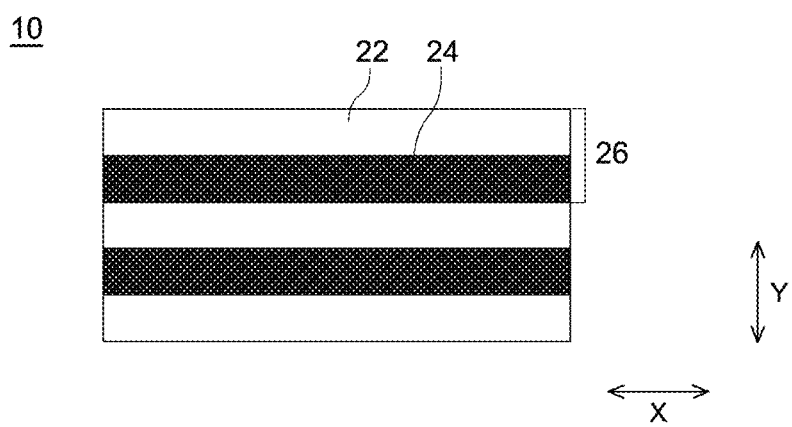
FIG. 1A is a view schematically showing an example of a pattern of a low-density region and a high-density region of an electrode according to one embodiment.

Hereinafter, a moisture powder disclosed herein and a film formation process (MPS) using the moisture powder will be described in detail by taking an electrode suitably employed for a lithium ion secondary battery which is a typical example of a secondary battery, as an example.

Matters other than those specifically mentioned in the present specification and required for implementation can be understood as design matters of those skilled in the art based on the conventional art in the fields. The contents of the technology disclosed herein can be implemented based on the contents disclosed in the present specification and common technical knowledge in the field.

In addition, dimensional relationships (between a length, a width, a height, and the like) do not reflect actual dimensional relationships.

The notation of "A to B (where A and B are arbitrary values)" indicating a range in the present specification means A or more and B or less.

A "lithium ion secondary battery" in the present specification refers to a secondary battery in which lithium ions in an electrolyte are responsible for transfer of charges. In addition, an "electrode body" refers to a structure forming a main body of a battery composed of a positive electrode and a negative electrode. In the present specification, when it is unnecessary to particularly distinguish a positive electrode from a negative electrode, these are simply referred to as electrodes. An electrode active material (that is, a positive electrode active material or a negative electrode active material) refers to a compound capable of reversibly occluding and releasing a chemical species (lithium ions in a lithium ion secondary battery) which is a charge carrier.

As shown in FIGS. 1A to 1D and FIG. 2, an electrode 10 according to the present embodiment includes an electrode current collector 12 and an electrode active material layer 14 formed on the current collector 12. The electrode 10 disclosed herein is characterized in that a low-density region 22 having a relatively low electrode density and a high-density region 24 having a relatively high electrode density are repeated on a surface of the electrode active material layer 14 in a predetermined pattern at a constant pitch.

As the electrode current collector 12, a metal electrode current collector used as an electrode current collector of this type of secondary battery can be used without particular limitation. In a case where the electrode current collector 12 is a positive electrode current collector, the electrode current collector 12 is made of, for example, a metal material, such as aluminum, nickel, titanium, or a stainless steel, having favorable conductivity. Aluminum (for example, aluminum foil) is particularly preferable. In a case where the electrode current collector 12 is a negative electrode current collector, the electrode current collector 12 is made of, for example, a metal material, such as copper, an alloy mainly composed of copper, nickel, titanium, or a stainless steel, having favorable conductivity. Copper (for example, copper foil) is particularly preferable. The thickness of the electrode current collector 12 is, for example, approximately 5 µm to 20 µm and preferably 8 µm to 15 µm.

The electrode material forming the electrode active material layer 14 contains at least a plurality of electrode active material particles, a binder resin, and a solvent.

A compound with a composition employed as a negative electrode active material or a positive electrode active material of a conventional secondary battery (here, a lithium ion secondary battery) can be used as an electrode active material which is a main component of a solid content. Examples of negative electrode active materials include carbon materials such as graphite, hard carbon, and soft carbon. In addition, examples of positive electrode active materials include lithium transition metal composite oxides such as $LiNi_{1/3}Co_{1/3}Mn_{1/3}O_2$, $LiNiO_2$, $LiCoO_2$, $LiFeO_2$, $LiMn_2O_4$, and $Li_{0.5}Ni_{0.5}Mn_{1.5}O_4$, and lithium transition metal phosphate compounds such as $LiFePO_4$. The average particle diameter of an electrode active material is not particularly limited but is suitably about 0.1 µm to 50 µm and preferably about 1 to 20 µm. In the present specification, an "average particle diameter" refers to a particle diameter (also referred to as $D_{50}$, a median diameter) corresponding to a cumulative frequency of 50 volume % from the fine particle side having a small particle diameter in a volume-based particle size distribution based on a usual laser diffraction-light scattering method.

As solvents. N-methyl-2-pyrrolidone (NMP), aqueous solvents (water or a mixed solvent mainly composed of water), or the like can be preferably used.

Examples of binder resins include polyvinylidene fluoride (PVDF), carboxymethyl cellulose (CMC), styrene butadiene rubber (SBR), and polvacrylic acid (PAA). An appropriate binder resin is employed depending on a solvent to be used.

The electrode material may contain substances other than an electrode active material and a binder resin as a solid content, for example, a conductive material, a thickener, or the like. Suitable examples of conductive materials include carbon black such as acetylene black (AB) and carbon materials such as a carbon nanotube. In addition, carboxymethyl cellulose (CMC), methyl cellulose (MC), or the like can be preferably used as a thickener, for example. The electrode material may contain materials (for example, various additives) other than those described above as long as the effects of the present disclosure are not impaired.

In the present specification, a "solid content" refers to a material (solid material) excluding a solvent among the above-described materials, and a "solid fraction" refers to a proportion of a solid content in an electrode material in which all materials are incorporated.

The average film thickness of the electrode active material layer 14 is not particularly limited, but may be, for example, 10 µm or more and 300 µm or less (for example, 20 µm or more and 250 µm or less). From the viewpoint of increasing the capacity of a battery, the average film thickness is preferably thicker than before, and may be, for example, about 150 µm or more and 300 µm or less (for example, 200 µm or more and 250 µm or less).

A low-density region 22 having a relatively low electrode density and a high-density region 24 having a relatively high electrode density are formed on a surface of the electrode 10 disclosed herein in a predetermined pattern at a constant pitch as shown in FIGS. 1A to 1D. In the present specification, the "electrode density (g/cm³)" refers to a solid content density obtained by excluding voids (gas phases)

from the electrode active material layer (that is, a coating film after drying). For example, the electrode density (g/cm$^3$) can be obtained by dividing the mass W of an electrode active material layer by an apparent volume V of the electrode active material layer. The apparent volume V of the electrode active material layer can be obtained using the area S of the electrode active material layer when in a plan view and the thickness T of the electrode active material layer.

Since the electrode density (g/cm$^3$) varies depending on an electrode material or the like which is used, it can be stated unconditionally. However, in a case where, for example, the electrode is a positive electrode, the electrode density is preferably 1.0 g/cm$^3$ or more and 4.5 g/cm$^3$ or less, more preferably 2.0 g/cm$^3$ or more and 4.2 g/cm$^3$ or less, and still more preferably 2.2 g/cm$^3$ or more and 3.8 g/cm$^3$ or less. In a case where the electrode is a negative electrode, the electrode density is, for example, preferably 0.8 g/cm$^3$ or more and 2.0 g/cm$^3$ or less, more preferably 0.9 g/cm$^3$ or more and 1.8 g/cm$^3$ or less, and still more preferably 1.0 g/cm$^3$ or more and 1.6 g/cm$^3$ or less. Typically, the low-density region 22 and the high-density region 24 are formed within the above-described ranges of the electrode density.

Figure 1B:
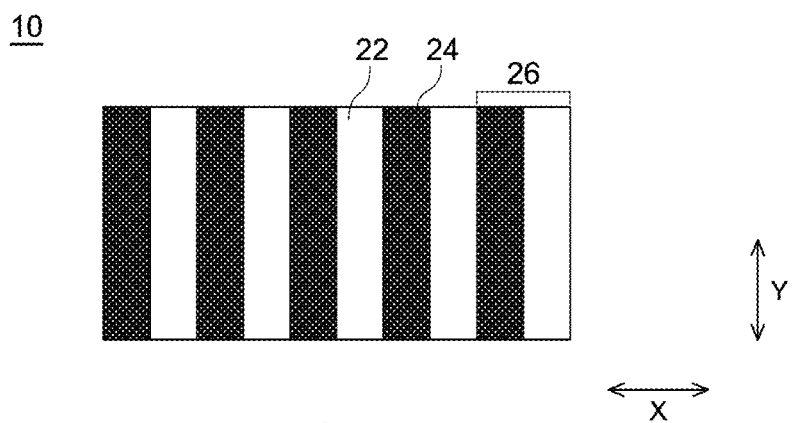
FIG. 1B is a view schematically showing another example of a pattern of a low-density region and a high-density region of an electrode according to one embodiment.
Figure 1C:
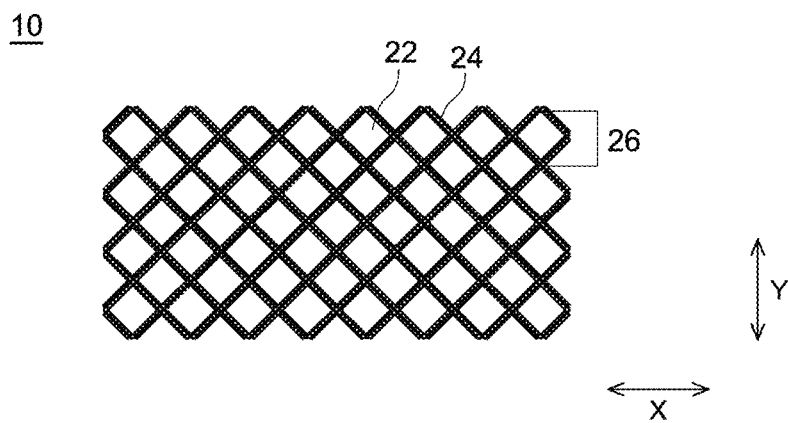
FIG. 1C is a view schematically showing another example of a pattern of a low-density region and a high-density region of an electrode according to one embodiment.
Figure 1D:
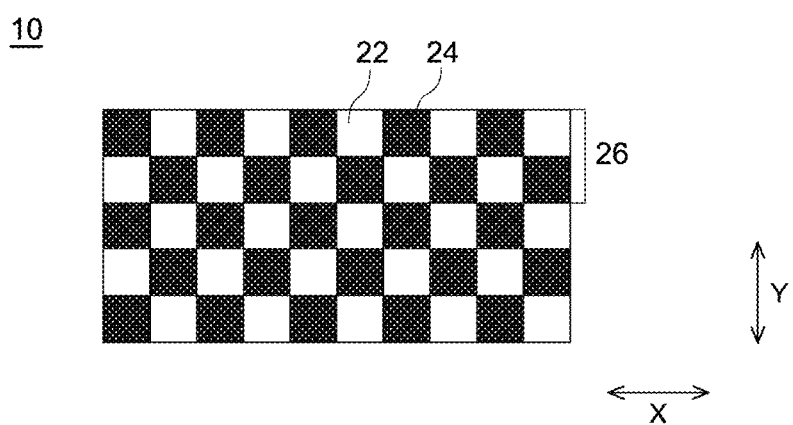
FIG. 1D is a view schematically showing another example of a pattern of a low-density region and a high-density region of an electrode according to one embodiment.

In addition, in the present specification, a "pattern" refers to a specific shape (design). A "pitch" refers to a smallest unit in which a low-density region 22 and a high-density region 24 are repeated, and is represented by a reference numeral 26 in FIG. 2. FIGS. 1A to 1D schematically show typical predetermined patterns formed on the electrode 10. Predetermined patterns may be a horizontal stripe shape, a vertical stripe shape, a rhombic shape, or a dot shape as shown in FIGS. 1A to 1D. There may be a formation in which there is a constant pitch 26 in only one of an X-direction or a Y-direction as shown in FIGS. 1A and 1B.

Figure 2:
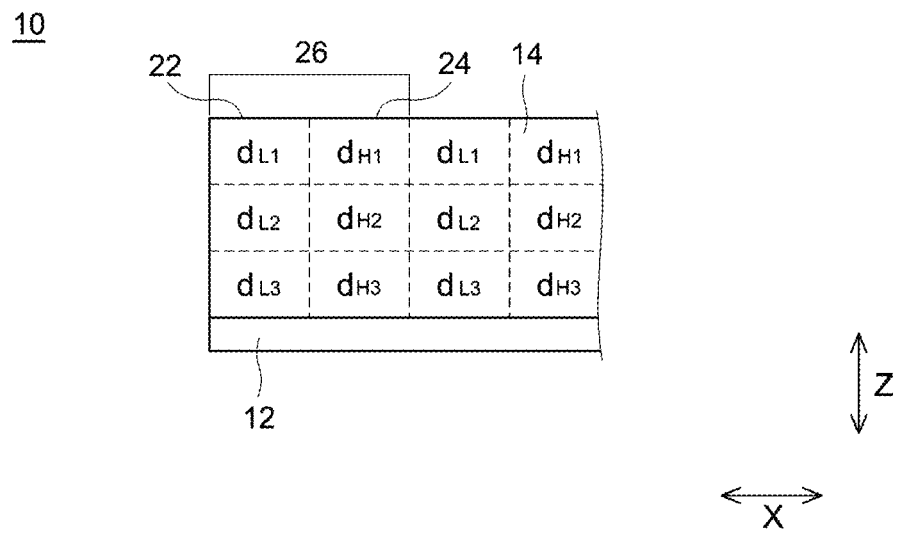
FIG. 2 is a view schematically illustrating an electrode according to one embodiment.

FIG. 2 is a view schematically showing an example of the electrode disclosed herein. In FIG. 2, reference sign X indicates a longitudinal direction of the electrode and a reference sign Z indicates a thickness direction of the electrode. As shown in FIG. 2, three layers obtained by evenly dividing the electrode active material layer 14 are referred to as an upper layer, an intermediate layer, and a lower layer in the present specification. The lower layer, the intermediate layer, and the upper layer are positioned in this order along a thickness direction (Z-direction) from an interface between the electrode active material layer 14 and the electrode current collector 12. For example, the lower layer refers to a layer positioned at within approximately 33% of the thickness of the electrode active material layer 14 along the thickness direction (Z-direction) from the interface between the electrode active material layer 14 and the electrode current collector 12. Similarly, the intermediate layer refers to a layer positioned at approximately 33% to 66% of the thickness of the electrode active material layer 14 along the thickness direction (Z-direction) of the electrode active material layer 14, and the upper layer refers to a layer positioned at approximately 66% to 100% of the thickness of the electrode active material layer 14. In addition, electrode densities of an upper layer, an intermediate layer, and a lower layer in the low-density region 22 are respectively $d_{L1}$, $d_{L2}$, and $d_{L3}$, and electrode densities of an upper layer, an intermediate layer, and a lower layer in the high-density region 24 are respectively $d_{H1}$, $d_{H2}$, and $d_{H3}$.

The electrode densities of an upper layer, an intermediate layer, and a lower layer can be obtained by, for example, multiplying the true density of an electrode by a filling rate of a corresponding range (that is, any of the upper layer, the intermediate layer, and the lower layer). The true density of an electrode is, for example, a value calculated based on the content and density of components. The filling rate of a corresponding range can be calculated by, for example, performing binarization processing in cross-sectional observation of an electrode active material layer using a scanning electron microscope (SEM). Specifically, a plurality of cross-sectional images are acquired, and open-source image analysis software "ImageJ" known as public domain image processing software is used to perform binarization processing in which a solid phase portion present in a corresponding range is made white and a gas phase (void) portion is made black. Accordingly, the filling rate can be calculated from "S1/(S1+S2)×100," where the area of a portion (white portion) where there is a solid phase is defined as S1 and the area of a void portion (black portion) is defined as S2.

The electrode 10 disclosed herein is characterized in that the electrode densities (g/cm$^3$) of upper layers and lower layers of the low-density region 22 and the high-density region 24 have a relation of $(d_{H1}/d_{L3})<(d_{H1}/d_{L1})$. That is, the difference in electrode density between the upper layers of the electrode 10 (electrode active material layer 14) is larger than the difference in electrode density between the lower layers thereof, and low-density region 22 having a relatively low electrode density and a high-density region 24 having a relatively high electrode density are formed on the surface portion of the electrode 10. According to such a configuration, since a low-density region 22 which is an insertion and desorption route for Li ions and a high-density region 24 in which a conductive path improves are present on the upper layer of the electrode active material layer 14 which can serve as an interface with an electrolytic solution, the Li ion diffusion resistance is reduced. Accordingly, it is possible to improve the output characteristics of a secondary battery in which the electrode 10 is used.

In addition, in the electrode active material layer 14, the electrode densities of an upper layer and a lower layer of the low-density region 22 have a relation of $(d_{L1}/d_{L3})<1.1$. The electrode densities of an upper layer and a lower layer of the low-density region 22 more preferably have a relation of $0.8<(d_{L1}/d_{L3})<1.1$ and still more preferably have a relation of $0.9<(d_{L1}/d_{L3})<1.08$. In a case where there is no difference in electrode density between an upper layer and a lower layer of the low-density region 22, the value of $(d_{L1}/d_{L3})$ is 1. That is, in the electrode 10 disclosed herein, the difference in electrode density between an upper layer and a lower layer of the low-density region 22 is small (that is, $(d_{L1}/d_{L3})$ is close to 1). According to such a configuration, when such a low-density region is formed in a state in which the density difference between an upper layer and a lower layer is small, Li ions can be suitably introduced into the electrode active material present near the current collector.

The low-density region 22 and the high-density region 24 are formed in a predetermined pattern at a constant pitch. Such a pitch is, for example, preferably 250 μm or more and 5 mm or less, more preferably 750 μm or more and 4 mm or less, and still more preferably 1 mm or more and 3 mm or less. If the pitch is within such ranges, the above-described effect can be more suitably exhibited.

In the electrode active material layer 14, a concave/convex shape is formed on a surface in a predetermined pattern, for example. When the electrode active material layer 14 has a concave/convex shape, the low-density region 22 is formed on a concave portion at a relatively low position and the high-density region 24 is formed in a convex portion at a relatively high position. The depth of the concave portion (that is, the height difference of a concave/convex shape) of the concave/convex shape is not particularly limited, but may be about 5 μm to 100 μm (for example, 10 μm to 50 μm). According to such a configuration, since the low-density region 22 that can be an insertion and desorption route for Li ions is formed in a region relatively lower than the high-density region 24, Li ions can suitably diffuse to a lower layer of the electrode 10 (electrode active material layer 14).

In a case where the electrode active material layer 14 has a concave/convex shape on its surface, the electrode active material layer 14 is evenly divided into the three layers of an upper layer, an intermediate layer, and a lower layer in the thickness direction in each of the concave portion and the convex portion.

The reason why the ion diffusivity of the electrode 10 can be improved by forming the low-density region 22 and the high-density region 24 on the surface of the electrode active material layer 14 in a predetermined pattern at a constant pitch is not particularly limited, but is assumed as follows. Since there are a relatively large number of voids (gas phases) between solid contents (for example, electrode active materials and conductive materials) in the low-density region 22 having a relatively low electrode density of the electrode active material layer 14 (that is, a coating film after drying), insertion and desorption routes for Li ions are formed therein. This promotes movement of Li ions between an electrolyte and the electrode 10. On the other hand, since there are relatively few voids (gas phases) in the high-density region 24 having a relatively high electrode density, solid contents are more closely packed. By improving the contact characteristics between electrode active materials and between an electrode active material and a conductive material which are solid contents, a conductive path is suitably formed in the high-density region 24. In addition to this, by forming the low-density region 22 and the high-density region 24 in a predetermined pattern at a constant pitch, the entire electrode active material layer 14 can be made to efficiently contribute to an electrochemical reaction and battery performance of the electrode 10 can be improved.

Method for Producing Electrode

Figure 3:
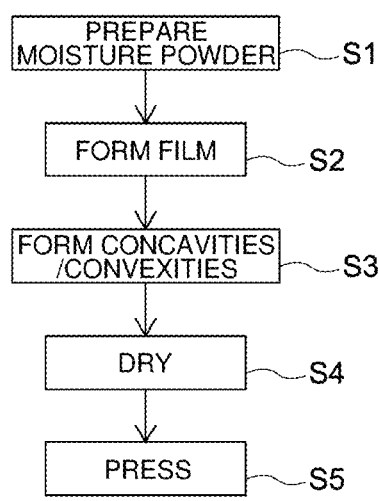
FIG. 3 is a flowchart showing a rough process of a method for producing an electrode according to one embodiment.

As shown in FIG. 3, roughly speaking, the method of producing an electrode disclosed here includes the following 5 steps: (1) a step in which a moisture powder (electrode material) is prepared (S1); (2) a step in which a coating film composed of the moisture powder is formed (S2); (3) a step in which concavities/convexities are formed on the coating film (S3); (4) a step in which the coating film is dried after the formation of the concavities/convexities (S4); and (5) a step in which the coating film (electrode active material layer) is pressed after drying (S5), and is characterized in that a coating film is formed while leaving a gas phase and concavities/convexities are formed before the drying step. Accordingly, other steps are not particularly limited, and the same configuration as that of this kind of conventional production method may be used. Hereinafter, each of the steps will be described.

Figure 4:
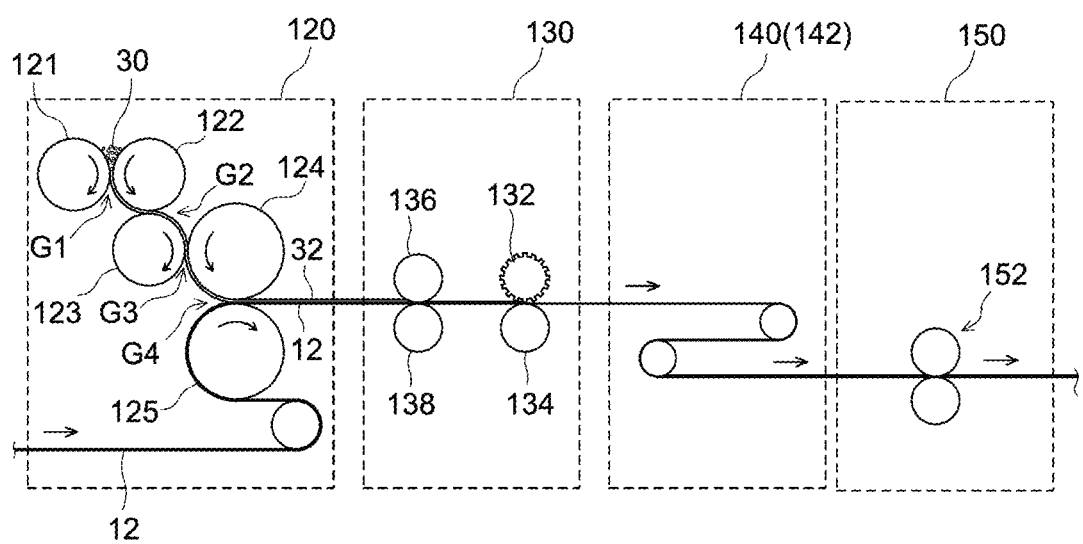
FIG. 4 is a block diagram schematically showing a configuration of an electrode production apparatus including a roll film formation unit according to one embodiment.

FIG. 4 is an explanatory view schematically showing an overview configuration of an electrode production apparatus including a roll film formation unit according to the present embodiment. An electrode production apparatus 100 shown in FIG. 4 typically includes: a film formation unit 120 which forms a coating film 32 made of an electrode material 30 on the surface of the sheet-shaped electrode current collector 12 while transporting the electrode current collector 12 which has been transported from a supply chamber not shown in the drawing along a longitudinal direction; a coating film processing unit 130 which forms a concave/convex shape on the surface of the coating film 32; a drying unit 140 which appropriately dries the coating film 32 having a concave/convex shape on its surface to form an electrode active material layer 14; and a pressing unit 150 which presses the electrode active material layer 14 after drying at an appropriate pressing pressure. These are arranged in order along a predetermined transport route.

Preparing Step

The electrode material 30 can be prepared by mixing the above-described materials such as an electrode active material, a solvent, a binder resin, and other additives with each other using a mixing device well-known in the conventional art. Examples of such mixing devices include a planetary mixer, a ball mill, a roll mill, a kneader, and a homogenizer.

The electrode material 30 may have the form of a paste, a slurry, and a granulated body. However, a granulated body, particularly a moisture granulated body (moisture powder) containing a small amount of solvent, is suitable for the purpose of forming the electrode active material layer 14 on the electrode current collector 12 in the electrode production apparatus 100 disclosed herein. Morphological classification of moisture powders in the present specification is disclosed in "Particle Size Enlargement" by Capes C. E. (published by Elsevier Scientific Publishing Company, 1980), in which four classifications currently well known are employed and the moisture powder disclosed herein is clearly defined. Specifically, the four classifications are as follows.

The existence forms (filled states) of solid contents (solid phases), solvents (liquid phases), and voids (gas phases) in the agglomerated particles constituting a moisture powder can be classified into four states: a "pendular state," a "funicular state," a "capillary state," and a "slurry state."

Figure 5A:
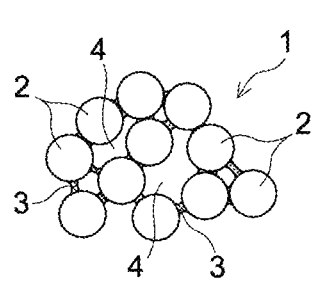

Here, as shown in FIG. 5A, "pendular state" means a state in which a solvent (liquid phase) 3 is discontinuously present so as to cross-link between active material particles (solid phases) 2 in aggregated particles 1, and the active material particles (solid phases) 2 may be present in a state where these are connected to (continuous with) each other. As shown in the drawing, the content of the solvent 3 is relatively low. As a result, most of voids (gas phases) 4 present in the aggregated particles 1 are continuously present and form communication holes that lead to the outside. In addition, one characteristic of the pendular state is that a continuous solvent layer is not observed over the entire outer surface of the agglomerated particle 1 in electron microscope observation (SEM observation).

Figure 5B:
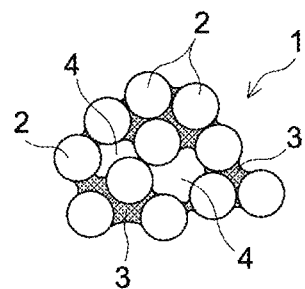

In addition, as shown in FIG. 5B, the "funicular state" means a state in which the content of a solvent in aggregated particles 1 is relatively higher than that in the pendular, and a state in which a solvent (liquid phase) 3 is present continuously around active material particles (solid phases) 2 in the aggregated particles 1. However, since the amount of solvent is still small, the active material particles (solid phases) 2 are present in a state where these are connected to (continuous with) each other similarly to the pendular state. On the other hand, although the proportion of communication holes among voids (gas phases) 4 present in the aggregated particles 1 which communicate with the outside tends to decrease slightly and the proportion of discontinuous isolated voids present therein tends to increase, the presence of communication holes is recognized.

The funicular state is a state between the pendular state and the capillary state, if funicular states are classified into a funicular I state, which is closer to the pendular state (that is, a state in which the amount of solvent is relatively low), and a funicular II state, which is closer to the capillary state (that is, a state in which the amount of solvent is relatively high), a funicular I state encompasses a state in which a connected layer of solvent is not observed at the outer surface of the aggregated particle 1 in electron microscope observations (SEM observations).

Figure 5C:
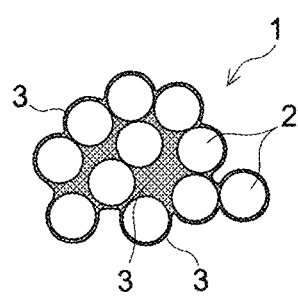

As shown in FIG. 5C, in the "capillary state," the content of a solvent in the aggregated particles 1 increases so that the amount of solvent in the aggregated particles 1 is in a nearly saturated state. As a result of a sufficient amount of solvent 3 present around the active material particles 2, the active material particles 2 are present in a discontinuous state. Regarding voids (gas phases) present in the aggregated particles 1, almost all the voids (for example, 80 vol % of the total void volume) are present as isolated voids due to the increase in the amount of solvent, and the abundance ratio of the voids in the aggregated particles also becomes small.

Figure 5D:
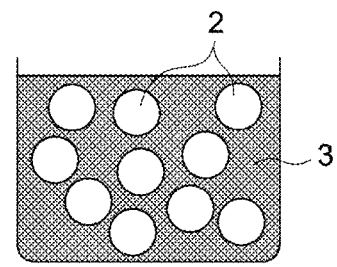

As shown in FIG. 5D, the "slurry state" is a state where the active material particles 2 are suspended in the solvent 3 and are no longer called aggregated particles, here is almost no gas phase.

Moisture powder sheeting in which a film is formed with a moisture powder is known in the conventional art. However, in the moisture powder in the moisture powder sheeting in the conventional art, a liquid phase is continuously formed over the entire powder. In other words, the moisture powder is in the "capillary state" shown in FIG. 5C.

In contrast, the moisture powder disclosed herein is (1) a moisture powder in which at least 50% by number or more of the aggregated particles 1 form the above-described pendular state or funicular state (particularly the funicular I state). The moisture powder preferably has (2) one morphological characteristic that a layer of the solvent is not recognized over the entire outer surface of the aggregated particles in electron microscope observation.

Hereinafter, the moisture powder satisfying the above-described requirements (1) and (2) disclosed herein will be referred to as a "gas phase-controlled moisture powder."

It is preferable that, in the gas phase-controlled moisture powder disclosed herein, at least 50% by number or more of aggregated particles satisfy the above-described requirements (1) and (2).

The gas phase-controlled moisture powder can be produced according to a conventional process of producing a moisture powder in a capillary state. That is, by adjusting the amount of solvent and the formulation of solid contents (such as active material particles and a binder resin) so that the proportion of a gas phase is larger than before, specifically, many continuous voids (communication holes) leading to the outside are formed inside aggregated particles, a moisture powder as an electrode material (electrode mixture) included in the above-described pendular state or funicular state (particularly the funicular I state) can be produced.

In addition, in order to realize liquid cross-linking between active materials with a minimum amount of solvent, it is desirable that the surface of a powder material used and a solvent used have appropriate affinity.

It is preferable that examples of suitable gas phase-controlled moisture powders disclosed herein include a moisture powder in which states of three phases recognized through electron microscope observation are a pendular state or a funicular state (particularly a funicular I state) and in which "the ratio of the loose bulk specific gravity X and the true specific gravity Y (Y/X)" is 1.2 or more, preferably 1.4 or more (and further preferably 1.6 or more) and is 2 or less, the ratio being calculated from the loose bulk specific gravity X (g/mL), which is measured by placing an obtained moisture powder in a container having a prescribed volume (mL) and then leveling the moisture powder without applying a force, and the raw material-based true specific gravity Y (g/mL), which is the specific gravity calculated from the composition of the moisture powder on the assumption that no gas phase is present.

Figure 6:
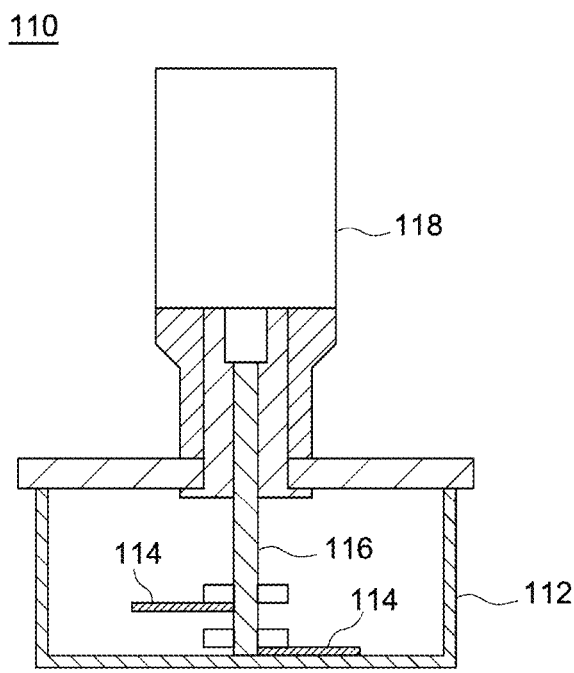
FIG. 6 is an explanatory view schematically showing an example of an agitation granulator according to one embodiment.

Regarding the above-described moisture powder, a moisture powder (that is, an aggregate of aggregated particles) can be produced by mixing materials using an agitation granulator (a mixer such as a planetary mixer) 110 as shown in FIG. 6. As shown in the drawing, this type of agitation granulator 110 typically includes a mixing vessel 112 which is cylindrical, a mixing blade 114 accommodated in the mixing vessel 112, and a motor 118 which is connected to the mixing blade (also referred to as a blade) 114 through a rotation shaft 116. An electrode active material and various additives (such as a binder resin, a thickening material, and a conductive material) which are solid contents are placed in the mixing vessel 112 of the agitation granulator 110 as shown in FIG. 6, and the mixing blade 114 is rotated, for example, at a rotational speed of 2000 rpm to 5000 rpm for about 1 to 30 seconds by driving the motor 118 to produce a mixture of solid matters. Then, a small amount of solvent measured so that the amount of solid contents is 55% or more and more preferably 60% or more (for example, 65% to 90%) is added to the mixing vessel 112, and the mixing blade 114 is further rotated, for example, at a rotational speed of 100 rpm to 1000 rpm for about 1 to 30 seconds. Accordingly, a moisture granulated body (moisture powder) can be produced by mixing the materials with the solvent in the mixing vessel 112. Furthermore, it is possible to prevent aggregation of the moisture powder by intermittently performing short stirring at a rotational speed of about 1000 rpm to 3000 rpm for about 1 to 5 seconds. The particle diameter of an obtained granulated body may be, for example, 50 μm or more (for example, 100 μm to 300 μm).

In addition, the above-described gas phase-controlled moisture powder has a low solvent content to the extent that a layer of a solvent is not recognized on the outer surface of aggregated particles (for example, a solvent fraction may be about 2% to 15% or 3% to 8%) and conversely has a relatively large gas phase part. Such a gas phase-controlled moisture powder can be produced according to the process of producing the above-described moisture powder. That is, by adjusting the amount of solvent and the formulation of solid contents (such as active material particles and a binder resin) so that the proportion of a gas phase is larger than that in the above-described moisture powder, specifically, many continuous voids (communication holes) leading to the outside are formed inside aggregated particles, a moisture powder as an electrode material included in the above-described pendular state or funicular state (particularly the funicular I state) can be produced. In addition, in order to realize liquid cross-linking between active materials with a minimum amount of solvent, it is desirable that the surface of a powder material used and a solvent used have appropriate affinity.

Film Forming Step

Figure 7:
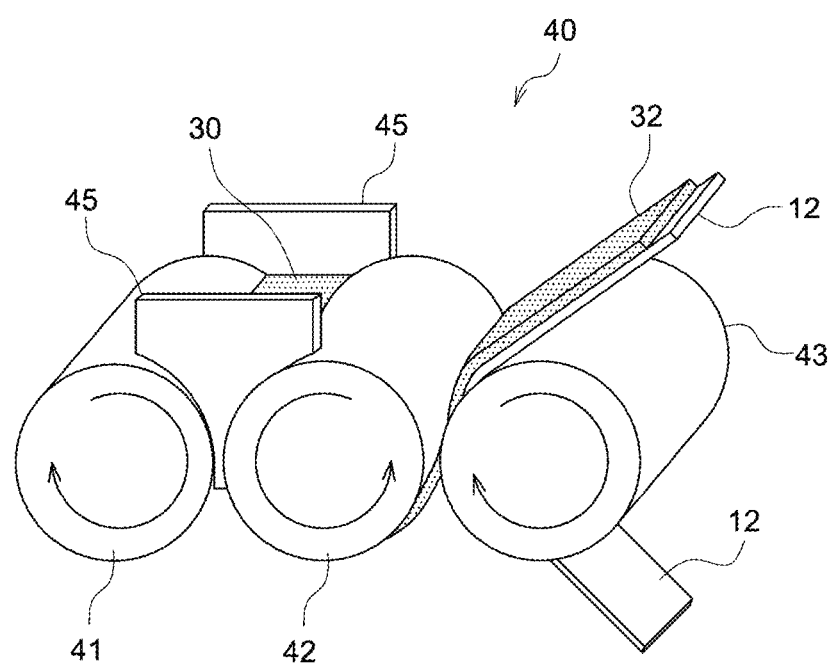
FIG. 7 is an explanatory view schematically showing a configuration of a film formation device according to one embodiment.

The production method disclosed herein is characterized in that the coating film 32 is formed while leaving a gas phase (void) of the electrode material 30. The coating film 32 made of the electrode material 30 can be formed using a film formation device 40 as schematically shown in FIG. 7, for example. The film formation device 40 includes a pair of rotary rolls 41 and 42 including a first rotary roll 41 (hereinafter, referred to as a "supply roll 41") and a second rotary roll 42 (hereinafter, referred to as a "transfer roll 42."). The outer circumferential surface of the supply roll 41 and the outer circumferential surface of the transfer roll 42 face each other, and the pair of rotary rolls 41 and 42 can rotate in opposite directions as shown by arrows in FIG. 7. In addition, the supply roll 41 and the transfer roll 42 are separated by a distance corresponding to a desired thickness of the coating film 32 formed on the electrode current collector 12. That is, there is a gap having a predetermined width (thickness) between the supply roll 41 and the transfer roll 42, and the thickness of the coating film 32 made of the electrode material 30 attached to the surface of the transfer roll 42 can be controlled by the size of such a gap. In addition, by adjusting the size of such a gap, a force for compressing the electrode material 30 passing between the supply roll 41 and the transfer roll 42 can also be adjusted. For this reason, by making the size of the gap relatively large, the film formation can be performed in a state where gas phases of the electrode material 30 (specifically, each of the aggregated particles) are maintained.

Partition walls 45 are provided at both end portions of the supply roll 41 and the transfer roll 42 in the width direction. The partition walls 45 play roles of holding the electrode material 30 on the supply roll 41 and the transfer roll 42 and defining the width of the coating film 32 formed on the electrode current collector 12 depending on the distance between the two partition walls 45. The electrode material 30 is supplied between these two partition walls 45 using a feeder (not shown in the drawing) or the like.

In the film formation device 40 according to the present embodiment, a backup roll 43 is disposed next to the transfer roll 42 as a third rotary roll. The backup roll 43 plays a role of transporting the electrode current collector 12 to the transfer roll 42. The transfer roll 42 and the backup roll 43 rotate in opposite directions as shown by arrows in FIG. 7.

The supply roll 41, the transfer roll 42, and the backup roll 43 are respectively connected to mutually independent drive units (motors) not shown in the drawing. By gradually increasing the rotational speeds of the supply roll 41, the transfer roll 42, and the backup roll 43 in this order, the electrode material 30 can be transported along the transfer roll 42 and can be transferred as the coating film 32 on the surface of the electrode current collector 12 which has been transported from the outer circumferential surface of the transfer roll 42 using the backup roll 43.

In FIG. 7, the supply roll 41, the transfer roll 42, and the backup roll 43 are arranged so that respective rotation shafts thereof are arranged horizontally, but the present disclosure is not limited thereto.

The sizes of the supply roll 41, the transfer roll 42, and the backup roll 43 are not particularly limited, but may be the same as those of the conventional film formation device. For example, the diameters may be 50 mm to 500 mm, respectively. The diameters of these three kinds of rotary rolls 41, 42, and 43 may be the same as or different from each other. In addition, the width for forming the coating film 32 may also be the same as that of the conventional film formation device and can be appropriately determined depending on the width of the electrode current collector 12 on which the coating film 32 is formed.

The materials of the outer circumferential surfaces of the supply roll 41, the transfer roll 42, and the backup roll 43 may be the same as those of the rotary rolls in the conventionally well-known film formation device, and examples thereof include SUS steel and SUJ steel. In order to prevent generation of metal foreign substances, the materials of the outer circumferential surfaces of the supply roll 41 and the transfer roll 42 that are directly brought into contact with the electrode material 30 are more preferably ceramics such as zirconia, alumina, chromium nitride, aluminum nitride, titania, and chromium oxide.

As shown in FIG. 4, similarly to the above-described film formation device 40, the film formation unit 120 includes a supply roll 121, transfer rolls 122, 123, and 124, and a backup roll 125 which are respectively connected to mutually independent drive units (motors) not shown in the drawing.

The film formation unit 120 according to the present embodiment includes a plurality of continuous transfer rolls as shown in the drawing. In this example, the film formation unit includes a first transfer roll 122 facing the supply roll 121, a second transfer roll 123 facing the first transfer roll 122, and a third transfer roll 124 facing the second transfer roll 123 and the backup roll 125.

Since the supply roll 121, the first transfer roll 122, the second transfer roll 123, the third transfer roll 124, and the backup roll 125 are connected to the independent drive units (motors) not shown in the drawing, these can be rotated at different rotational speeds. Specifically, the rotational speed of the first transfer roll 122 is higher than that of the supply roll 121, the rotational speed of the second transfer roll 123 is higher than that of the first transfer roll 122, the rotational speed of the third transfer roll 124 is higher than that of the second transfer roll 123, and the rotational speed of the backup roll 125 is higher than that of the third transfer roll 124.

By gradually increasing the rotational speed along the transport direction (advancing direction) of the current collector between the rotary rolls in this manner, multi-stage roll film formation different from the film formation device 40 of FIG. 7 can be performed.

As shown in FIG. 4, when the space between the supply roll 121 and the first transfer roll 122 is set to a first gap G1, the space between the first transfer roll 122 and the second transfer roll 123 is set to a second gap G2, the space between the second transfer roll 123 and the third transfer roll 124 is set to a third gap G3, and the space between the third transfer roll 124 and the backup roll 125 is set to a fourth gap G4, the sizes of the gaps are set such that the first gap G1 is relatively maximized and the second gap G2, the third gap G3, and the fourth gap G4 are gradually reduced in this order (G1>G2>G3>G4). Since the gaps G1 to G4 are set so as to be gradually reduced along the transport direction (advancing direction) of the electrode current collector 12, the coating film 32 can be formed while adjusting the state of gas phases (voids) of the coating film. The sizes (widths) of the gaps G1 to G4 are not particularly limited but may be set to sizes of the gaps so that the average film thickness of the coating film 32 is 10 μm or more and 300 μm or less (for example, 20 μm or more and 150 μm or less).

In addition, in a case where the electrode material 30 is a gas phase-controlled moisture powder, a suitable coating film can be formed while maintaining communication holes of the gas phase-controlled moisture powder by performing multi-stage roll film formation. That is, excessive crushing of aggregated particles constituting the gas phase-controlled moisture powder can be prevented, communication holes can be maintained, and generation of isolated voids in the aggregated particles can be prevented.

Concave/Convex Forming Step

Formation of concavities/convexities on the coating film 32 can be performed, for example, using a concavity/convexity transfer roller 132 and a backup roller 134 as shown in FIG. 4. The method for producing an electrode disclosed herein is characterized in that a concave/convex forming step S3 is carried out on the coating film 32 formed while leaving voids (gas phases). The average porosity (gas phase rate) of such a coating film 32 is preferably at least 1% or more, and may be, for example, 1% or more and 55% or less, and typically 5% or more and 55% or less. Since spreadability is improved by forming concavities/convexities while leaving gas phases, desired concave/convex shapes can be imparted to the coating film 32 with a load smaller than before. In addition, concave/convex shapes can be formed on the surface portion of the coating film 32 without locally increasing the density (densification) even if a load is applied thereto to form concavities/convexities.

In the present specification, an "average porosity (gas phase rate) of a coating film" can be calculated through observation of a cross section of the coating film using a scanning electron microscope (SEM), for example. The cross-sectional image is subjected to binarization processing, in which a solid phase portion or a liquid phase portion is made white and a gas phase (void) portion is made black, using open-source image analysis software "ImageJ" known as public domain image processing software. Accordingly, "S2/(S1+S2)×100" can be calculated by defining the area of a portion (white portion) where there is a solid phase or a liquid phase as S1 and the area of a void portion (black portion) as S2. This is regarded as a porosity of the coating film before drying. A plurality of cross-sectional SEM images are acquired (for example, 5 images or more), and an average value of such porosity is regarded as the "average porosity (gas phase rate) of a coating film" here before drying. Concave portions (that is, macroscopic voids) formed in the process of forming concavities/convexities are not included in the "average porosity (gas phase rate) of a coating film."

The concavity/convexity transfer roll 132 has concave portions and convex portions for forming a predetermined pattern on the surface of the coating film 32 at a constant pitch. The backup roll 134 is a roll for sending the electrode current collector 12 which has been transported in the transport direction while supporting the electrode current collector. The concavity/convexity transfer roll 132 and the backup roll 134 are arranged at positions facing each other. By passing the coating film 32 on the electrode current collector 12 through the gap between the concavity/convexity transfer roll 132 and the backup roll 134, the concave/convex portion of the concavity/convexity transfer roll 132 can be transferred to the surface of the coating film 32 to form a desired shape on the surface of the coating film 32. The linear pressure of the concavity/convexity transfer roll 132 is not particularly limited because it varies depending on the depth of a concave portion with a desired shape, but can be set to approximately 15 N/cm to 75 N/cm, for example, about 25 N/cm to 65 N/cm.

Here, a method of processing concavities/convexities on the coating film 32 can be performed by a method other than transfer of concavities/convexities using the concavity/convexity transfer roller. For example, a concave/convex shape may be formed on the surface portion of the coating film 32 through pressing using a flat plate rolling mill having a desired concave/convex shape. The pressing pressure in this case can be set to, for example, about 1 MPa to 100 MPa and 5 MPa to 80 MPa.

As a result of extensive studies of the present inventors, the pitch between a concave portion and a convex portion of the concavity/convexity transfer roll 132 can be set to 250 μm or more and 5 mm or less (for example, 1 mm or more and 3 mm or less). According to such a configuration, the coating film 32 after drying (electrode active material layer) can be appropriately provided with the low-density region 22 having a relatively low electrode density, and a high-density region 24 having a relatively high electrode density. As a result, the Li ion diffusivity of the coating film 32 after drying (electrode active material layer) can be improve.

Since gas phases are left in the coating film 32, even if a concave/convex shape is formed before a drying step S4, a desired pattern can be formed and maintained. In addition, more suitably, the coating film 32 is composed of a gas phase-controlled moisture powder. Since the gas phase-controlled moisture powder is formed in a state w % here communication holes are maintained as described above, formation and maintenance of a desired pattern can be more suitably performed.

Although only a pair of the concavity/convexity transfer roll 132 and the backup roll 134 are provided in the example shown in FIG. 4, the present disclosure is not limited thereto, and a plurality of concavity/convexity transfer rolls having different pressing pressures may be arranged along the transport direction.

In addition, the coating film processing unit 130 may further include a step of adjusting the film thickness or the electrode density of the coating film 32 using a press roll 136 and a backup roll 138. The press roll 136 is a roll for pressing and compressing the coating film 32 in the film thickness direction, and the backup roll 138 is a roll for sending the electrode current collector 12 which has been transported in the transport direction while supporting the electrode current collector. The press roll 136 and the backup roll 138 are arranged at positions facing each other. The coating film 32 made of the electrode material 30 in a pendular state or a funicular state (preferably a funicular I state) formed on the transported electrode current collector 12 can be pressed and compressed to the extent that isolated voids are not generated, for example. Accordingly, the state of gas phases of the coating film 32 can be adjusted so that the formation of concavities/convexities is more suitability carried out.

The suitable pressing pressure by the press roll 136 in the above-described step is not particularly limited because it may vary depending on the density or the film thickness of a target coating film (electrode active material layer), but can be set to, for example, about 0.01 MPa to 100 MPa or about 0.1 MPa to 70 MPa.

Drying Step

As shown in FIG. 4, a drying chamber 142 including a heater not shown in the drawing is disposed as the drying unit 140 on the downstream side of the coating film processing unit 130 of the electrode production apparatus 100 according to the present embodiment in the transport direction, and the coating film 32 transported from the coating film processing unit 130 is dried to form the electrode active material layer 14 on the surface of the electrode current collector 12. The drying method is not particularly limited, but examples thereof include techniques such as hot air drying or infrared drying. The drying step S4 may be the same as the drying step in this type of the conventional electrode production apparatus and does not particularly characterize the present teaching. Therefore, the detailed description thereof will be omitted.

Pressing Step

After the drying step S4, a pressing step S5 is carried out for the purpose of adjusting the electrode density or the weight of the electrode active material layer 14 in the pressing unit 150. Such a pressing step can be performed according to a well-known conventional method using a roll rolling mill or a flat plate rolling mill.

Figure 8A:
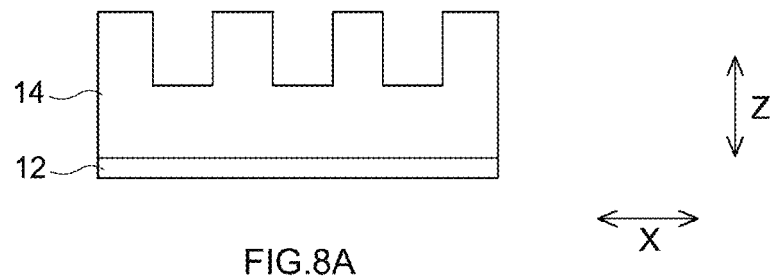
Figure 8B:
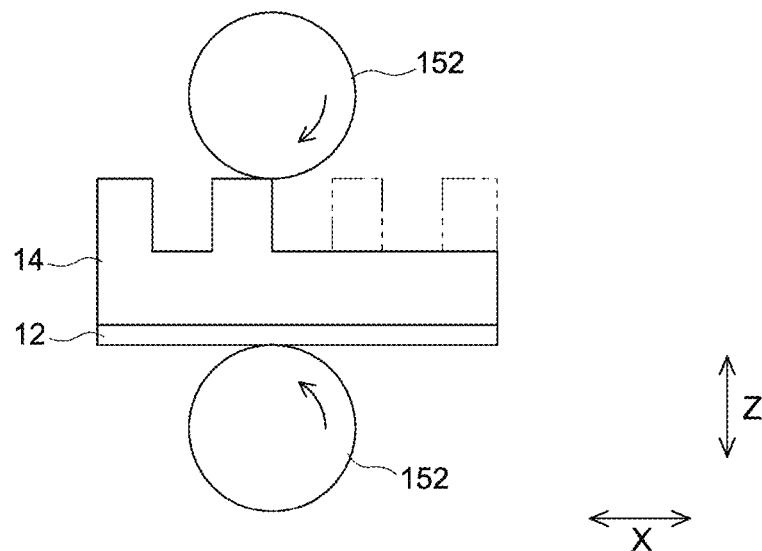
Figure 8C:
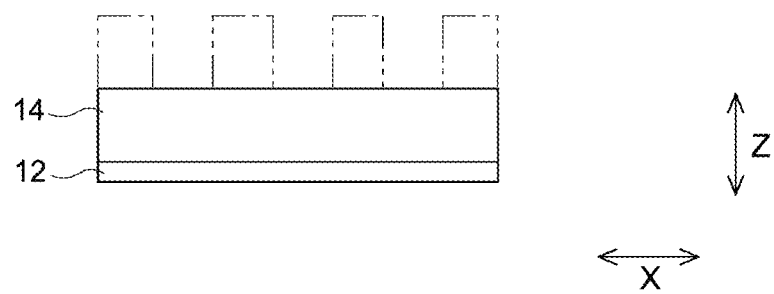
Figure 9A:
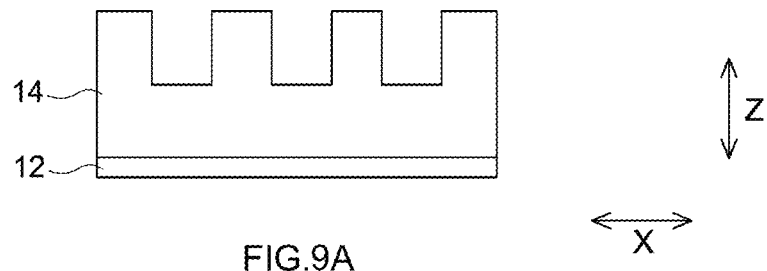
Figure 9B:
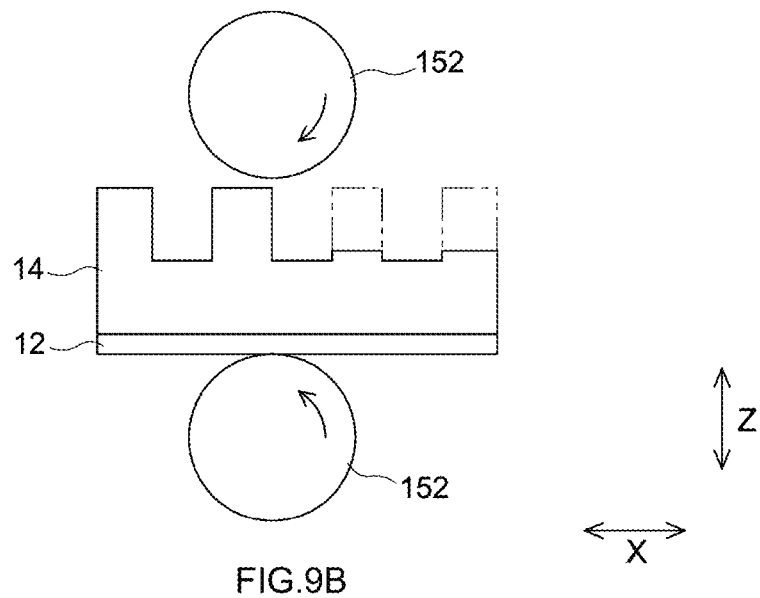
Figure 9C:
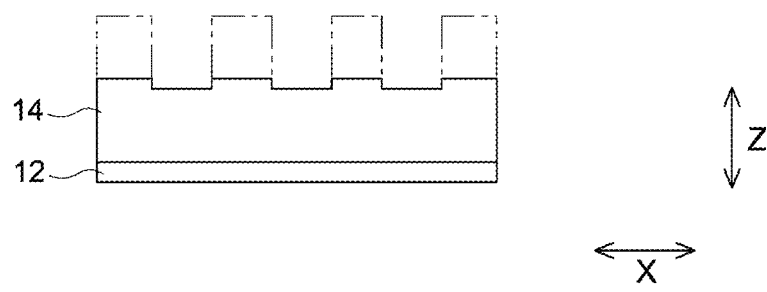

FIGS. 8A to 8C and FIGS. 9A to 9C are views schematically showing processes of pressing steps carried out after the drying step S4. In FIGS. 8A to 8C and FIG. 9A show states after the drying step, FIG. 9B show states of the pressing steps, and FIG. 9C show states after the pressing steps. Hereinafter, the pressing step S5 will be described with reference to FIGS. 8A to 8C and FIGS. 9A to 9C.

Since pressing carried out here is pressing carried out on the electrode active material layer 14 in which a solvent (liquid phase) is evaporated (volatilized) from the coating film 32 through the drying step S4, it is preferable that the pressing pressure be set to be relatively higher than that on the moistened coating film 32 before drying. For example, in roll pressing using a roll rolling mill, the linear pressure is preferably set to about 1 ton/cm to 5 ton/cm. In a case of pressing with a flat plate rolling mill, the pressing pressure is preferably set to, for example, about 100 to 500 MPa.

The electrode 10 (electrode active material layer 14) according to the present embodiment is transported to the pressing step S5 while maintaining a predetermined concave/convex shape after drying as shown in FIG. 8A. Pressing is carried out using a press device 152 as shown in FIG. 8B. At this time, convex portions of the electrode active material layer 14 are first pressed. When the convex portions of the electrode active material layer 14 is pressed to heights equal to those of concave portions of the electrode active material layer 14, the concave portions of the electrode active material layer 14 is also then pressed subsequently. Here, in a case of forming an electrode 10 in which the surface of the electrode active material layer 14 is flat as shown in FIG. 8C, the pressing pressure may be set so as to press the concave portions to heights of the concave portions of the electrode active material layer 14. In addition, in a case of forming an electrode 10 while leaving a slight concave/convex shape as shown in FIG. 9C, the pressing pressure for performing pressing to a desired height may be appropriately set. In FIGS. 8A to 8c and FIGS. 9A to 9C, reference sign X indicates a longitudinal direction of the electrode and a reference sign Z indicates a thickness direction of the electrode.

When a region which has been a convex portion of the electrode active material layer 14 in FIGS. 8A to 8C and FIG. 9A is pressed and compressed in the thickness direction (Z-direction), the region becomes a high-density region 24 having a relatively high electrode density. Such a high-density region may be a region having a high energy density. In addition, in a region which has been a concave portion of the electrode active material layer 14 in FIGS. 8A to 8C and FIG. 9A, the pressing pressure applied by the press device 152 is small, and the region becomes a low-density region 22 having a relatively low electrode density. According to such a production method, the high-density region 24 and the low-density region 22 can be formed in a desired pattern.

Sheet-shaped electrodes produced in this manner are used as these types of usual sheet-shaped positive or negative electrodes for constructing lithium ion secondary batteries.

Figure 10:
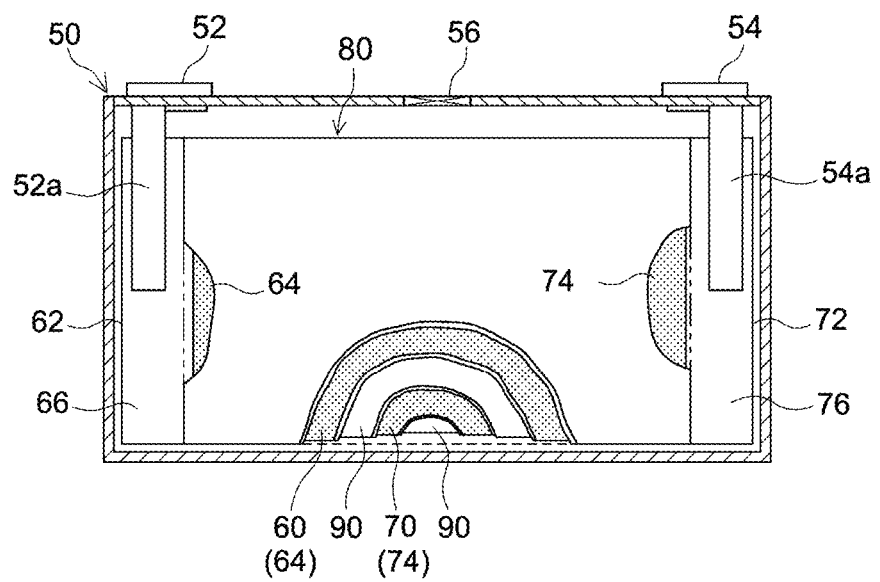
FIG. 10 is an explanatory view schematically showing a lithium ion secondary battery according to one embodiment.

For example, one example of a lithium ion secondary battery 200 that can be constructed using sheet-shaped electrodes according to the present embodiment is shown in FIG. 10.

The lithium ion secondary battery 200 shown in FIG. 10 is constructed such that a flat wound electrode body 80 and non-aqueous electrolyte (not shown in the drawing) are accommodated in a sealable box-shaped battery case 50. The battery case 50 is provided with a positive electrode terminal 52 and a negative electrode terminal 54 for external connection, and a thin safety valve 56 which is set to release the internal pressure of the battery case 50 in a case where the internal pressure rises above a predetermined level. In addition, the battery case 50 is provided with an injection port (not shown in the drawing) for injecting a non-aqueous electrolyte. The positive electrode terminal 52 and the positive electrode current collector plate 52a are electrically connected to each other. The negative electrode terminal 54 and the negative electrode current collector plate 54a are electrically connected to each other. Regarding the material of the battery case 50, a light metallic material having a high strength and good thermal conductivity is preferable, and examples of such metallic materials include aluminum or steel.

The wound electrode body 80 typically has a form in which a long sheet-shaped positive electrode (hereinafter, referred to as a positive electrode sheet 60) and a long sheet-shaped negative electrode (hereinafter, referred to as a negative electrode sheet 70) are superposed via a long sheet-shaped separator 90 and wound in the longitudinal direction. The positive electrode sheet 60 has a configuration in which a positive electrode active material layer 64 is formed on a single surface or both surfaces of a positive electrode current collector 62 along the longitudinal direction. The negative electrode sheet 70 has a configuration in which a negative electrode active material layer 74 is formed on a single surface or both surfaces of a negative electrode current collector 72 along the longitudinal direction. A portion in which the positive electrode current collector 62 is exposed (that is, a positive electrode current collector-exposed portion 66) without the positive electrode active material layer 64 formed along the edge is provided on one edge of the positive electrode current collector 62 in the width direction. A portion in which the negative electrode current collector 72 is exposed (that is, a negative electrode current collector-exposed portion 76) without the negative electrode active material layer 74 formed along the edge is provided on another edge of the negative electrode current collector 72 in the width direction. The positive electrode current collector plate 52a and the negative electrode current collector plate 54a are respectively joined to the positive electrode current collector-exposed portion 66 and the negative electrode current collector-exposed portion 76.

A positive electrode and a negative electrode obtained through the above-described production method are used as the positive electrode (positive electrode sheet 60) and the negative electrode (negative electrode sheet 70). In the present configuration example, the electrode active material layer 14 (the positive electrode active material layer 64 and the negative electrode active material layer 74) are formed as a positive electrode and a negative electrode on both surfaces of the current collector 12 (the positive electrode current collector 62 and the negative electrode current collector 72).

Examples of the separator 90 include porous sheets (films) made of resins such as polyethylene (PE), polypropylene (PP), polyester, cellulose, and polyamide. Such porous sheets may have a single-layer structure or a structure in which two or more layers are stacked (for example, three-layer structure in which PP layers are stacked on both surfaces of a PE layer). The separator 90 may be provided with a heat resistant layer (HRL).

Non-aqueous electrolytes which are the same as those of conventional lithium ion secondary batteries can be used, and typically, organic solvents (non-aqueous solvents) containing supporting salts can be used. Organic solvents such as carbonates, esters, ethers, nitriles, sulfones, and lactones can be used as non-aqueous solvents without particular limitation. Specifically, for example, non-aqueous solvents such as ethylene carbonate (EC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC) can be preferably used. Such non-aqueous solvents can be used alone or in combination of two or more thereof. As supporting salts, lithium salts such as $LiPF_6$, $LiBF_4$, and $LiClO_4$ can be suitably used, for example. The concentration of supporting salts is not particularly limited, but is preferably about 0.7 mol/L or more and 1.3 mol/L or less.

The above-described non-aqueous electrolytes may contain components in addition to the above-described non-aqueous solvents and supporting salts, for example, various additives such as a gas generator, a film forming agent, a dispersant, and a thickener as long as the effect of the present disclosure is not significantly impaired.

The lithium ion secondary battery 200 configured as described above can be used for various applications. Examples of suitable applications include drive power sources mounted in vehicles such as battery electric vehicles (BEV), hybrid electric vehicles (HEV), and plug-in hybrid electric vehicles (PHEV). The lithium ion secondary battery 200 can also be used in the form of an assembled battery in which a plurality of lithium ion secondary batteries are connected in series and/or in parallel.

Hereinafter, some examples in a case where the gas phase-controlled moisture powder in a pendular state or a funicular state disclosed herein is used as an electrode mixture will be described. However, the technology disclosed herein is not intended to be limited to that shown in such examples.

First Test

A gas phase-controlled moisture powder that can be suitably used as a positive electrode material was produced, and then, a positive electrode active material layer was formed on aluminum foil using the produced moisture powder (positive electrode material).

In the present example, lithium transition metal oxide ($LiNi_{1/3}Co_{1/3}Mn_{1/3}O_2$) having an average particle diameter ($D_{50}$) of 20 μm based on a laser diffraction scattering method was used as a positive electrode active material, polyvinylidene fluoride (PVDF) was used as a binder resin, acetylene black was used as a conductive material, and NMP was used as a non-aqueous solvent.

First, a solid content consisting of 90 parts by mass of the above-described positive electrode active material, 2 parts by mass of PVDF, and 8 parts by mass of acetylene black was placed in an agitation granulator (a planetary mixer or a high speed mixer) having a mixing blade as shown in FIG. 6 to perform a mixing and stirring treatment.

Specifically, the rotational speed of the mixing blade in the agitation granulator having the mixing blade was set to 4500 rpm, and a stirring and dispersing treatment was performed for 15 seconds to obtain a mixture of the powder material composed of the above-described solid content. NMP, which is a solvent, was added to the obtained mixture so that the solid fraction was 90 weight %, stirring, granulating, and compounding were performed at a rotational speed of 300 rpm for 30 seconds, and then, stirring was performed at a rotational speed of 4500 rpm for 2 seconds to perform micronization. Accordingly, a moisture powder (positive electrode material) according to the present example was produced.

Next, the above-described gas phase-controlled moisture powder (positive electrode material) was supplied to a film formation unit of the electrode production apparatus, and a coating film was transferred to the surface of a positive electrode current collector made of aluminum foil which was prepared separately (Example 1).

The gas phase rate (porosity) (%) of the obtained coating film described above of Example 1 before drying was measured. Specifically, the gas phase rate was calculated by observing a cross-sectional image using a scanning electron microscope (SEM). The cross-sectional image was acquired and subjected to binarization processing, in which a solid phase portion or a liquid phase portion is made white and a gas phase (void) portion is made black, using open-source image analysis software "ImageT". Accordingly, "S2/(S1+S2)×100" was calculated by defining the area of a portion (white portion) where there is a solid phase or a liquid phase as S1 and the area of a void portion (black portion) as S2. This is regarded as a porosity of the coating film before drying. Five cross-sectional SEM images were acquired, and an average value of such porosity was regarded as the "average porosity (gas phase rate) of a coating film" before drying here.

As a result, the average porosity of the coating film of Example 1 was 55%.

The coating film of Example 1 was transported to a coating film processing unit, and a concave/convex shape (with a pitch of 1 mm) was imparted using a concavity/convexity transfer roll (at a linear pressure of about 40 N/cm). The coating film having such a concave/convex shape was heat-dried in a drying unit and then roll-pressed at a linear pressure of about 4 ton/cm. Accordingly, an electrode (positive electrode) in which an electrode active material layer made of a gas phase-controlled moisture powder was formed on an electrode current collector was obtained.

Figure 11:
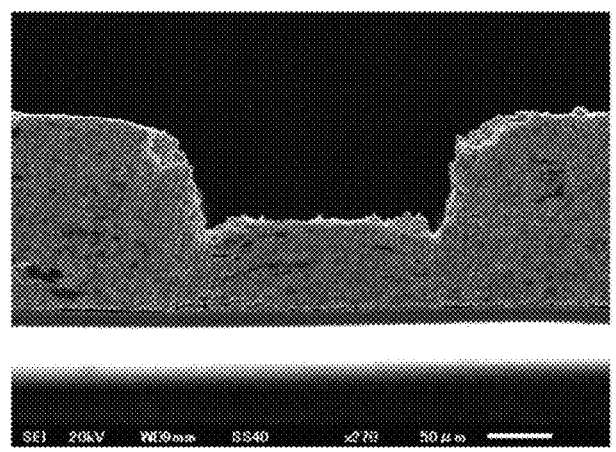
FIG. 11 is a cross-sectional SEM image showing a structure of a positive electrode active material layer (after pressing) formed using a gas phase-controlled moisture powder.

The state of the obtained electrode active material layer (that is, the coating film after drying) of Example 1 described above was observed with SEM. The results are shown in FIG. 11.

An electrode (positive electrode) material in a slurry state was prepared as a comparison target using the same material. Such a positive electrode material was applied on a positive electrode current collector, dried, and pressed to form a positive electrode active material layer. A solvent was supplied to such a positive electrode active material layer again, the entire electrode was pressed at a linear pressure of about 4 ton/cm in order to form a concave/convex shape (with a pitch of 1 mm) and dried again to obtain an electrode (positive electrode) (Comparative Example 1) in which the positive electrode active material layer having a concave/convex shape was formed.

The electrode densities (g/cm³) of Example 1 and Comparative Example 1 were measured. Regarding the electrode densities, regions A to D were set according to pitches formed from a reference point, and the electrode densities of an upper layer and a lower layer at each location were measured. The electrode densities of an upper layer and a lower layer were obtained by multiplying the true density of an electrode by the filling rate in a corresponding range. The true density of an electrode is calculated based on the content and density of components. In addition, the filling rate of a corresponding range was calculated by performing binarization processing using image analysis software "ImageJ" in cross-sectional observation of an electrode active material layer using a scanning electron microscope (SEM). The results are shown in Table 1.

Production of Lithium Ion Secondary Batteries for Evaluation Lithium ion secondary batteries for evaluation were produced using each of the above produced electrodes of Example 1 and Comparative Example 1.

Electrodes made of an electrode material in a slurry state were prepared as negative electrodes.

In addition, two porous polyolefin sheets having a three-layer structure of PP/PE/PP were prepared as separator sheets.

The produced electrodes (positive electrodes) of Example 1 and Comparative Example 1, negative electrodes, and the prepared two separator sheets were superposed and wound to produce wound electrode bodies. An electrode terminal was attached to each of the positive electrode sheets and the negative electrode sheets of the produced wound electrode bodies through welding and accommodated in a battery case having an injection port.

A non-aqueous electrolytic solution was injected from such an injection port, and the injection port was airtightly sealed with a sealing lid. As the non-aqueous electrolytic solution, one obtained by dissolving $LiPF_6$ as a supporting salt in a mixed solvent containing ethylene carbonate (EC), dimethyl carbonate (DMC), and ethyl methyl carbonate (EMC) at a volume ratio of 1:1:1 at a concentration of 1.0 mol/L was used. Lithium ion secondary batteries for evaluation were obtained as described above.

Activation Treatment

Each lithium ion secondary battery for evaluation was activated (initially charged) in an environment of 25° C. The activation treatment was a constant current-constant voltage system in which constant current charge was performed up to 4.2 V at a current value of ⅓C, and then constant voltage charge was performed until the current value reaches 1/50C to enter a fully charging state. Thereafter, constant current discharge was performed until the voltage became 3.0 V at a current value of ⅓C.

Initial Resistance Measurement

After the state of charge (SOC) of each activated lithium ion secondary battery for evaluation was adjusted to 60%, the battery was placed in a temperature environment of 25° C. The battery was discharged at a current value of 1C for 10 seconds to obtain a voltage drop amount (ΔV). The battery resistance was calculated by dividing such a voltage drop amount ΔV by the discharge current value (1C) and used as initial resistance. It is possible to evaluate that the output characteristics become better as such initial resistance becomes smaller. The results are shown in Table 1.

TABLE 1

| | | Electrode density (g/cm³) | | | | Initial resistance (Ω) |
|---|---|---|---|---|---|---|
| | | Region A | Region B | Region C | Region D | |
| Example 1 | Upper layer | 3.5 | 3.8 | 3.5 | 3.8 | 17.7 |
| | Lower layer | 3.5 | 3.5 | 3.5 | 3.5 | |
| Comparative Example 1 | Upper layer | 3.9 | 3.9 | 3.9 | 3.9 | 22.4 |
| | Lower layer | 3.4 | 3.4 | 3.4 | 3.4 | |

As shown in Table 1, in Comparative Example 1, the electrode densities in the upper layers of all regions A to D increased. In contrast, in Example 1, the electrode densities in the upper layers of the regions B and D increased, and it can be seen that high-density regions and low-density regions are formed on the surface portions of the electrode. In addition, the initial resistance of Example 1 was low compared to that of Comparative Example 1. That is, it can be seen that low-density regions having a relatively low electrode density and high-density regions having a relatively high density are repeated on the surface of an electrode active material layer in a predetermined pattern at a constant pitch, a secondary battery electrode having a relation of $(d_{H1}/d_{L1})<(d_{H1}/d_{L1})$ has improved ion diffusivity, and the initial resistance decreases in a case where the electrode is used in secondary batteries.

In addition, in Example 1, it can be seen that $(d_{L1}/d_{L3})<1.1$ is satisfied in the electrode density $d_{L1}$ of the upper layers and the electrode density $d_{L3}$ of the lower layers of the low-density regions.

Second Test

A second test was carried out by changing the conditions of the pitch of a concave/convex shape formed with an electrode material. Specifically, a gas phase-controlled moisture powder that can be suitably used as a negative electrode material was produced, and a negative electrode active material layer was formed on aluminum foil using the produced moisture powder (negative electrode material).

In the present example, graphite powder having an average particle diameter ($D_{50}$) of 10 μm based on a laser diffraction scattering method was used as a negative electrode active material, styrene butadiene rubber (SBR) was used as a binder resin, carboxymethyl cellulose (CMC) was used as a thickener, and water was used as a solvent.

First, a solid content consisting of 98 parts by mass of the above-described graphite powder, 1 part by mass of CMC, and 1 part by mass of SBR was placed in an agitation granulator (a planetary mixer or a high speed mixer) having a rotary blade as shown in FIG. 6 to perform a mixing and stirring treatment.

Specifically, the rotational speed of the rotary blade in the agitation granulator having the rotary blade was set to 4500 rpm, and a stirring and dispersing treatment was performed for 15 seconds to obtain a mixture of the powder material composed of the above-described solid components. Water, which is a solvent, was added to the obtained mixture so that the solid fraction was 90 mass %, stirring, granulating, and compounding were performed at a rotational speed of 300 rpm for 30 seconds, and then, stirring and micronizing treatment was continued at a rotational speed of 1000 rpm for 2 seconds. Accordingly, a moisture powder (negative electrode material) according to the present example was produced. The mixing and stirring treatment and the micronization were preformed to produce a moisture powder (negative electrode) according to the present example.

Next, the above-described gas phase-controlled moisture powder (negative electrode material) was supplied to a film formation unit of the electrode production apparatus, and a coating film was transferred to the surface of a negative electrode current collector made of copper foil which was prepared separately (Example 2).

The gas phase rate (porosity) (%) of the obtained coating film described above of Example 2 before drying was measured through the same method as that described above. As a result, the average porosity of the coating film of Example 2 was 50%.

The coating film of Example 2 was transported to a coating film processing unit, and a concave/convex shape (with a pitch of 250 μm) was imparted using a concavity/convexity transfer roll (at a linear pressure of about 40 N/cm). The coating film having such a concave/convex shape was heat-dried in a drying unit and then roll-pressed at a linear pressure of about 4 ton/cm. Accordingly, an electrode (negative electrode) in which an electrode active material layer made of a gas phase-controlled moisture powder was formed on an electrode current collector was obtained.

The electrode densities of Example 2 were measured through the same method as that described above. Regarding the electrode densities, regions A to D were set according to pitches formed from a reference point, and the electrode densities of an upper layer and a lower layer at each location were measured. The results are shown in Table 2.

In addition, a lithium ion secondary battery for evaluation was produced using the above produced electrode of Example 2. An electrode made of an electrode material in a slurry state was prepared as a positive electrode. Regarding other conditions, an initial resistance value was measured by preparing the lithium ion secondary battery for evaluation in the same manner as above. The results are shown in Table 2.

TABLE 2

|  |  | Electrode density (g/cm³) | | | | Initial resistance (Ω) |
| --- | --- | --- | --- | --- | --- | --- |
|  |  | Region A | Region B | Region C | Region D |  |
| Example 2 | Upper layer | 1.2 | 1.3 | 1.2 | 1.3 | 16.7 |
|  | Lower layer | 1.2 | 1.2 | 1.2 | 1.2 |  |

As shown in Table 2, even in a case where an electrode was prepared by changing an electrode material or a pitch, a region having a relatively high density and a region having a relatively low density can be formed on the surface portion of the electrode. In addition, it can also be seen that the initial resistance is a value almost the same as that of Example 1. In addition, also in the second test, it can be seen that $(d_{L1}/d_{L3})<1.1$ is satisfied in the electrode density $d_{L1}$ of the upper layers and the electrode density $d_{L3}$ of the lower layers of the low-density regions.

Specific examples of the present disclosure are described in detail in the preceding, but these are nothing more than examples and do not limit the scope of the claims.

Various and diverse modifications and alterations to the specific examples provided above as examples are included in the art described in the claims.

What is claimed is:

1. A secondary battery electrode that is either a positive or negative electrode of a secondary battery, the secondary battery electrode comprising:
    an electrode current collector; and
    an electrode active material layer formed on the electrode current collector, wherein
    a low-density region having a relatively low electrode density and a high-density region having a relatively high electrode density are repeated on a surface of the electrode active material layer in a predetermined pattern at a constant pitch, and
    with the electrode active material layer being evenly divided into three layers of an upper layer, an intermediate layer, and a lower layer in a thickness direction from the surface of the electrode active material layer to the electrode current collector, and
    the electrode densities (g/cm³) of the upper layer, the intermediate layer, and the lower layer of the low-density region are respectively $d_{L1}$, $d_{L2}$, and $d_{L3}$, and
    the electrode densities (g/cm³) of the upper layer, the intermediate layer, and the lower layer of the high-density region are respectively $d_{H1}$, $d_{H2}$, and $d_{H3}$,
    a relation of $(d_{H3}/d_{L3})<(d_{H1}/d_{L1})$ is satisfied.

2. The secondary battery electrode according to claim 1, wherein
    the upper layer $d_{L1}$ and the lower layer $d_{L3}$ of the low-density region in the electrode active material layer have a relation of $(d_{L1}/d_{L3})<1.1$.

3. The secondary battery electrode according to claim 1, wherein
    the low-density region and the high-density region are repeated at a pitch of 250 μm or more and 5 mm or less.

4. The secondary battery electrode according to claim 1, wherein
    the surface of the electrode active material layer has a concave/convex shape with a predetermined pattern,
    the low-density region is formed in a concave portion of the concave/convex shape, and
    the high-density region is formed in a convex portion of the concave/convex shape.

* * * * *